(12) United States Patent
Mouaici

(10) Patent No.: US 7,402,997 B2
(45) Date of Patent: Jul. 22, 2008

(54) DEVICE FOR DETERMINATION OF THE ANGULAR POSITION OF A ROTATING BODY

(75) Inventor: Gerard Mouaici, Toulouse (FR)

(73) Assignee: Continental Automotive France, Toulouse (FR)

( * ) Notice: Subject to any disclaimer, the term of this patent is extended or adjusted under 35 U.S.C. 154(b) by 0 days.

(21) Appl. No.: 10/586,363

(22) PCT Filed: Jan. 19, 2005

(86) PCT No.: PCT/EP2005/000471

§ 371 (c)(1),
(2), (4) Date: Jul. 18, 2006

(87) PCT Pub. No.: WO2005/080920

PCT Pub. Date: Sep. 1, 2005

(65) Prior Publication Data

US 2007/0159165 A1    Jul. 12, 2007

(30) Foreign Application Priority Data

Jan. 21, 2004    (FR)    .................................. 04 00524

(51) Int. Cl.
*G01B 7/30*    (2006.01)

(52) U.S. Cl. .............................. 324/207.21; 324/207.25
(58) Field of Classification Search .............. 324/207.2, 324/207.25, 207.21, 207.24, 207.26; 338/32 R, 338/32 H
See application file for complete search history.

(56) References Cited

U.S. PATENT DOCUMENTS

| | | | | |
|---|---|---|---|---|
| 4,137,512 | A * | 1/1979 | Sidor | 335/206 |
| 5,821,517 | A | 10/1998 | Fedeli et al. | |
| 5,825,178 | A * | 10/1998 | Hipp et al. | 324/207.2 |
| 5,982,169 | A * | 11/1999 | Furlani et al. | 324/207.2 |
| 2002/0175673 | A1* | 11/2002 | Butzmann | 324/174 |

FOREIGN PATENT DOCUMENTS

EP    1 150 094    10/2001

* cited by examiner

*Primary Examiner*—Jay M Patidar
(74) *Attorney, Agent, or Firm*—Young & Thompson

(57) ABSTRACT

A device for determining an angular position of a rotating body including a generator of magnetic flux connected to the rotating body and a magnetoresistive sensor connected to the support. The magnetic flux generator takes the form of a ring or a portion of a ring and comprises alternating poles making up a series of magnets generating magnetic fluxes in substantially parallel directions.

11 Claims, 1 Drawing Sheet

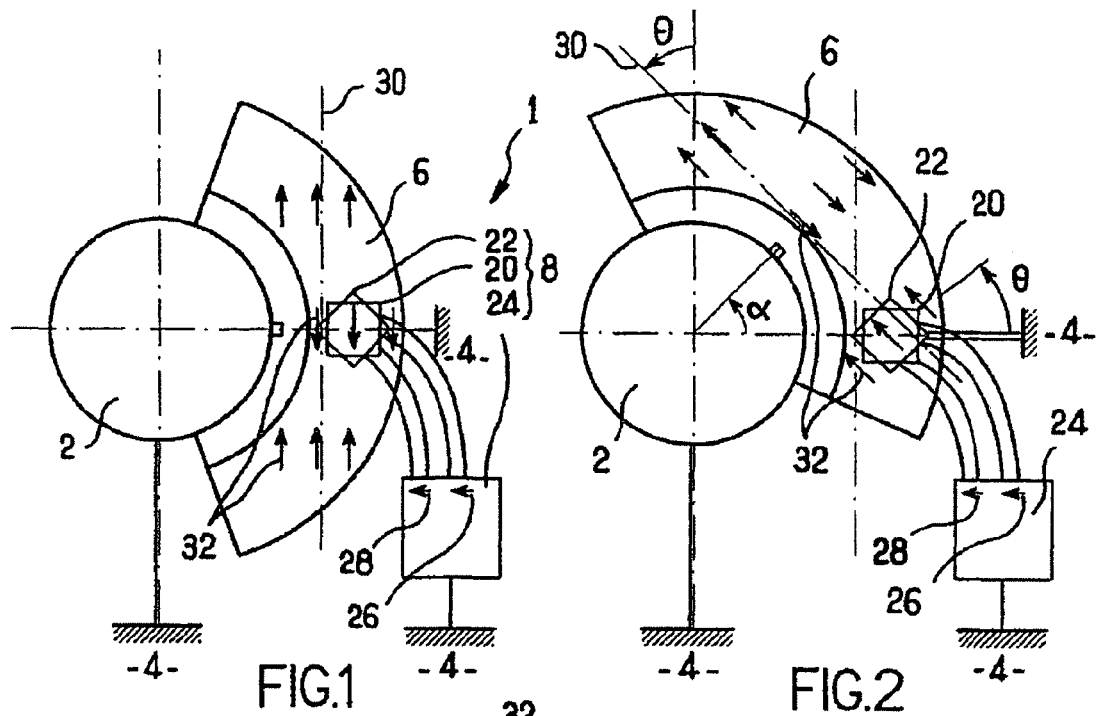
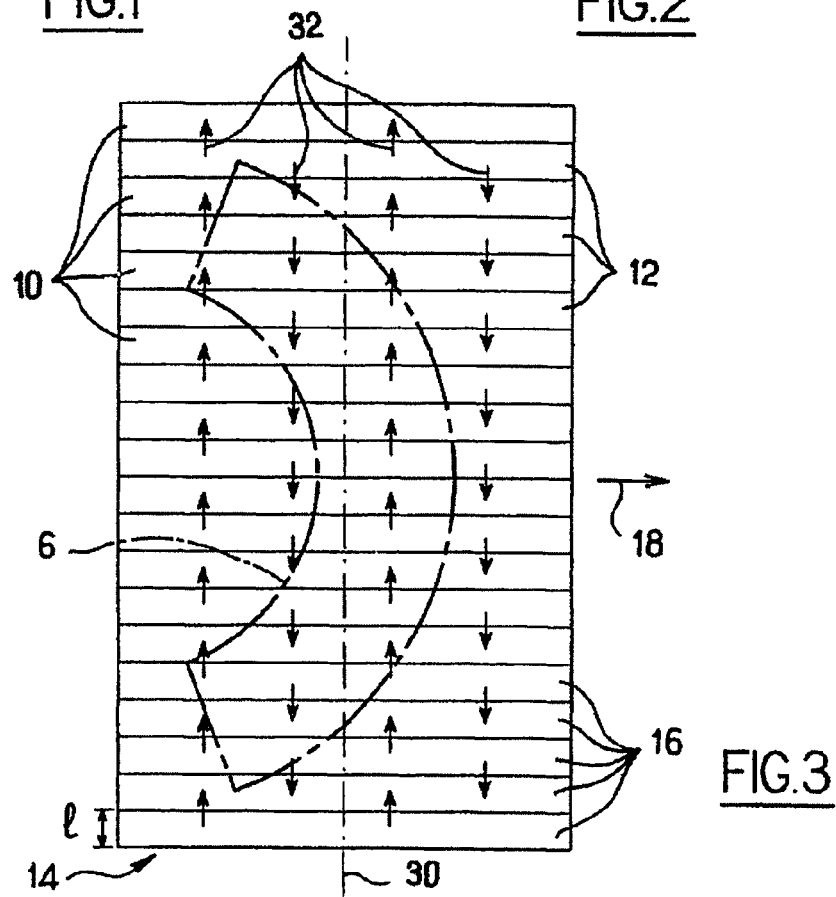

DEVICE FOR DETERMINATION OF THE ANGULAR POSITION OF A ROTATING BODY

FIELD OF THE INVENTION

The invention relates to a device for determination of the angular position in a direction of rotation of a rotating body relative to a support.

Such a device may be used in particular in a vehicle to know the position of a pedal, such as the clutch pedal, or of a valve such as the throttle valve.

DESCRIPTION OF RELATED ART

Devices are already known which comprise a magnetic flux generator and a magnetoresistive sensor generating an electrical signal as a function of the direction of the magnetic flux to which it is exposed. Such a sensor allows contactless measurement, in a reliable, robust and accurate manner, of the angular variations in magnetic flux. To avoid problems associated with transmission of the electrical signal generated by the magnetoresistive sensor, the magnetoresistive sensor is connected to the support and the magnetic flux generator to the rotating body.

The problem then arises of generating a magnetic flux whose direction varies continuously, in the vicinity of the magnetoresistive sensor, as a function of the angular position of the rotating body relative to the support, over a range of angular positions covering at least 90°. Such a problem is easily overcome when the magnetic flux generator is disposed at one end of the rotating body in the direction of rotation. However, the situation is completely different when such a configuration is not possible.

Indeed, rotation of the magnetic flux generator then brings about relative displacement between said magnetic flux generator and the sensor. To ensure that the magnetic flux generator is always in the vicinity of the sensor despite the rotation of the rotating body, the magnetic flux generator could be made in the form of a ring. However, it is then not obvious how to ensure that said ring-shaped generator generates a magnetic flux such that the angle between the magnetic flux and the sensor varies continuously as a function of the angular position of the rotating body.

Conversely, it is easy to produce magnets in the form of an (advantageously flat) rectilinear bar which generates a magnetic flux whose flux lines are parallel to each other. But, unless a bar of large dimensions is provided, the magnet rapidly finds itself remote from the sensor, such that it is possible to cover only a narrow range of angular positions.

SUMMARY OF THE INVENTION

To remedy this problem, according to the invention, the magnetic flux generator comprises alternating poles making up a series of magnets generating magnetic fluxes in substantially parallel directions.

Thus, the magnetic flux generator appears "from a microscopic point of view" as a series of poles disposed substantially facing one another, although the magnetic flux generator is non-rectilinear "from a macroscopic point of view".

BRIEF DESCRIPTION OF THE DRAWINGS

The invention will appear more clearly from the following description, made with reference to the appended drawings in which:

FIG. 1 is a schematic representation of a device according to the invention in a first position, FIG. 2 is a schematic representation of the device of FIG. 1 in a second position, FIG. 3 illustrates on an enlarged scale a strip from which is cut a magnetic flux generator according to the invention.

DETAILED DESCRIPTION OF THE PREFERRED EMBODIMENTS

FIGS. 1 and 2 illustrate a device 1 for determination of the angular position a of a rotating body relative to a support. Here, the rotating body consists of a hinge pin 2 of a pedal guided in rotation relative to the structure 4 of the vehicle.

The device 1 substantially comprises a magnetic flux generator 6 fixed to the hinge pin 2 and a sensor 8 of the magnetoresistive type fixed to the structure 4 of the vehicle.

The magnetic flux generator 6 takes the form of a ring portion extending over an angular sector having an arc of at least 120 degrees. In one embodiment, the ring portion extends over an angular sector of approximately 135 degrees. As illustrated in FIG. 3, this magnetic flux generator is cut from a flexible strip 14 comprising a series of lines 16 extending substantially in a direction 18. These lines 16 exhibit a substantially constant width 1 perpendicular to the direction 18. They consist in known manner of magnetized metallic particles coated in foam. They are magnetized so as to constitute alternately north poles 10 and south poles 12. Thus, two consecutive lines 16 define a magnet generating a magnetic flux in a direction 30 extending perpendicularly to the direction 18. The strip 14 consequently comprises a series of magnets generating magnetic fluxes 32 in substantially parallel but alternating directions.

The magnetic flux generator 6 takes the form of a ring portion extending over an angular sector having an arc of at least 120 degrees. In one embodiment, the ring portion extends over an angular sector of approximately 135 degrees. As illustrated in FIG. 3, this magnetic flux generator is cut from a flexible strip 14 comprising a series of lines 16 extending substantially in a direction 18. These lines 16 exhibit a substantially constant width 1 perpendicular to the direction 18. They consist in known manner of magnetized metallic particles coated in foam. They are magnetized so as to constitute alternately north poles 10 and south poles 12. Thus, two consecutive lines 16 define a magnet generating a magnetic flux in a direction 30 extending perpendicularly to the direction 18. The strip 14 consequently comprises a series of magnets generating magnetic fluxes 32 in substantially parallel but alternating directions.

The width 1 of each of the lines 16 must be small enough such that, once the magnetic flux generator 6 has been cut from the strip 14, two consecutive poles 10, 12 are barely offset relative one another in the direction 18, despite the non-rectilinear shape of the magnetic flux generator 6.

Advantageously, the magnetic flux generator 6 thus comprises at least 10 poles, fifteen in this instance, and the width of the lines is less than 5 millimeters, preferably less than or equal to 2 millimeters.

To avoid overcrowding FIGS. 1 and 2, the series of poles 10, 12 has not been shown in these figures, just a few magnetic fluxes 32 being represented.

The sensor 8 comprises two magnetoresistive elements 20, 22 offset physically by 45 degrees and a microcontroller 24 to which the magnetoresistive elements 20, 22 are connected. The magnetoresistive element 20 generates an electrical signal 26 in the form of voltage assuming the value: $A\sin 2\alpha$, where A is a constant and $\alpha$ the angle between the magnetoresistive element 20 and the magnetic flux 32 to which the magnetoresistive element 20 is exposed. Since the magnetoresistive element 22 is offset by 45 degrees relative to the magnetoresistive element 20, it generates an electrical signal 28 in the form of voltage assuming the value: Acos2α.

The electrical signals 26, 28 are collected by the microcontroller 24, which deduces the value of α therefrom to within 180 degrees. Since the generator 6 of magnetic flux 32 is fixed to the rotating body 2 and the sensor 8 is fixed to the structure 4 of the vehicle, the angle α is a function of the angular position α of the rotating body. In this case, these two angles are equal, such that the microcontroller 24 indicates the angular position α of the rotating body 2 relative to the structure of the vehicle from the signals 26, 28 supplied by the magnetoresistive elements 20, 22.

As it passes from one line 16 to the next, the magnetic flux 32 changes direction. However, given the characteristics of the magnetoresistive elements 20, 22 which have just been described, in particular the 180 degrees periodicity of the electrical signals 26, 28 generated with regard to the angle α, the inversion of the direction of the magnetic flux 32 does not cause any appreciable discontinuity in the angular position determined by the sensor 8.

The invention claimed is:

1. A device for determination of the angular position of a rotating body relative to a support, said device comprising:
    a rotatable body (2) rotatable about an axis of rotation;
    a generator (6) of magnetic flux (32) comprising a ring portion at least partially encircling the axis of rotation with an inner edge, an outer edge, and an annular surface between the inner edge and the outer edge, the inner edge connected to the rotatable body;
    a plurality of thin, rectilinear magnets of substantially equal size (16) arranged on the annular surface as a series of adjacent, alternating poles (10,12) aligned along a rectilinear axis running on the annular surface;
    a support(4) proximate to the rotatable body; and
    a magnetoresistive sensor (8) connected to the support (4), wherein the plurality of rectilinear magnets generate a plurality of magnetic fluxes in directions substantially parallel to the rectilinear axis.

2. The device as claimed in claim 1, characterized in that the width (1) of each rectilinear magnet is less than 5 millimeters.

3. The device as claimed in claim 2, characterized in that the magnetic flux generator (6) comprises at least 10 alternating poles (10, 12).

4. The device as claimed in claim 1, characterized in that the magnetic flux generator (6) comprises at least 10 alternating poles (10, 12).

5. The device as claimed in claim 4, characterized in that the ring portion of said magnetic flux generator (6) has an arc of at least 120 degrees.

6. The device as claimed in claim 4, characterized in that the magnetoresistive sensor (8) comprises two magnetoresistive elements (20, 22) offset angularly by 45° and a microcontroller (24) configured to determine the angular position of the rotatable body (2) from electrical signals (26, 28) transmitted by said magnetoresistive elements.

7. The device as claimed in claim 4, characterized in that the ring portion of said magnetic flux generator (6) has an arc of approximately 135 degrees.

8. The device as claimed in claim 1, characterized in that the ring portion of said magnetic flux generator (6) has an arc of at least 120 degrees.

9. The device as claimed in claim 8, characterized in that the magnetoresistive sensor (8) comprises two magnetoresistive elements (20, 22) offset angularly by 45° and a microcontroller (24) configured to determine the angular position of the rotatable body (2) from electrical signals (26, 28) transmitted by said magnetoresistive elements.

10. The device as claimed in claim 1, characterized in that the magnetoresistive sensor (8) comprises two magnetoresistive elements (20, 22) offset angularly by 450° and a microcontroller (24) configured to determine the angular position of the rotatable body (2) from electrical signals (26, 28) transmitted by said magnetoresistive elements.

11. The device as claimed in claim 1, characterized in that the ring portion of said magnetic flux generator (6) has an arc of approximately 135 degrees.

* * * * *